US009464797B1

(12) United States Patent
Hou

(10) Patent No.: US 9,464,797 B1
(45) Date of Patent: Oct. 11, 2016

(54) LIGHTING EFFECT-CONTROLLABLE COMPUTER CASE

(71) Applicant: Nzxt Corporation, City of Industry, CA (US)

(72) Inventor: Johnny Hou, City of Industry, CA (US)

(73) Assignee: NZXT INC., City of Industry, CA (US)

( * ) Notice: Subject to any disclaimer, the term of this patent is extended or adjusted under 35 U.S.C. 154(b) by 0 days.

(21) Appl. No.: 14/678,539

(22) Filed: Apr. 3, 2015

(51) Int. Cl.
| F21V 33/00 | (2006.01) |
| F21V 23/00 | (2015.01) |
| F21V 23/06 | (2006.01) |
| F21V 21/096 | (2006.01) |
| F21V 21/08 | (2006.01) |
| G06F 1/18 | (2006.01) |
| F21Y 103/00 | (2016.01) |
| F21Y 101/02 | (2006.01) |

(52) U.S. Cl.
CPC ......... *F21V 23/007* (2013.01); *F21V 21/0808* (2013.01); *F21V 21/096* (2013.01); *F21V 23/06* (2013.01); *F21V 33/0052* (2013.01); *G06F 1/182* (2013.01); *F21Y 2101/02* (2013.01); *F21Y 2103/003* (2013.01)

(58) Field of Classification Search
CPC .... F21V 23/007; F21V 23/06; F21V 21/096; F21V 21/0808; F21V 33/0052; G06F 1/182; F21Y 2103/003; F21Y 2101/02
USPC ............ 362/154, 217.1, 249.02, 362, 217.13
See application file for complete search history.

(56) References Cited

U.S. PATENT DOCUMENTS

| 4,825,879 A * | 5/1989 | Tan ..................... A61B 5/02427 600/344 |
| 7,621,662 B1 * | 11/2009 | Colbert ................ B60Q 1/2611 362/479 |
| 2006/0244622 A1 * | 11/2006 | Wray ........................ G09F 9/33 340/815.45 |
| 2010/0295473 A1 * | 11/2010 | Chemel ................ H05B 37/029 315/294 |
| 2012/0062148 A1 * | 3/2012 | Kim .................... H05B 33/0815 315/297 |
| 2013/0063042 A1 * | 3/2013 | Bora ................... H05B 33/0863 315/292 |
| 2015/0163888 A1 * | 6/2015 | Fredricks ........... H05B 37/0272 119/51.04 |
| 2016/0223149 A1 * | 8/2016 | Gerpheide ................ F21L 4/00 362/103 |

* cited by examiner

*Primary Examiner* — Bao Q Truong
*Assistant Examiner* — Glenn Zimmerman
(74) *Attorney, Agent, or Firm* — Muncy, Geissler, Olds & Lowe, P.C.

(57) ABSTRACT

The present invention discloses a lighting effect-controllable computer case, which comprises a computer case containing electrically-connected computer components, including a motherboard and a power source; a lighting controller electrically connected with the motherboard disposed inside the computer case; and at least one LED light strip disposed inside or outside the computer case, electrically connected with the lighting controller, including a plurality LEDs, and presenting different lighting effects according to at least one control signal generated by the lighting controller.

8 Claims, 2 Drawing Sheets

LIGHTING EFFECT-CONTROLLABLE COMPUTER CASE

BACKGROUND OF THE INVENTION

1. Field of the Invention

The present invention relates to a computer case, particularly to a lighting effect-controllable computer case.

2. Description of the Related Art

In the digital age, people rely on computers in working and amusement, and a family normally has at least one computer. The processing capability of notebook computers is growing stronger and stronger. However, notebook computers are still hard to parallel desktop computers in computing capability, upgradability and screen size. Therefore, a person is likely to dispose a desktop computer at his home and carry about a lightweight notebook computer when going out.

A computer case is normally a mere cubic body. So far, computer cases have been set free from a black or white color. However, the diversification of computer cases is still insufficient for the young. Under the background of boiling music and vivid images of a computer game, the computer case seems especially dull and inconsistent with the mood.

Accordingly, the present invention proposes a lighting effect-controllable computer case to overcome the abovementioned problems. The technical scheme and embodiments thereof will be described in detail below.

SUMMARY OF THE INVENTION

The primary objective of the present invention is to provide a lighting effect-controllable computer case, wherein LED (Light Emitting Diode) light strips are arranged on a compute case, and wherein a lighting controller is disposed inside the computer case and electrically connected with the LED light strips and the motherboard, whereby the user can use a computer or a mobile device to control the mode and effect of lighting, and whereby the computer case possesses a vivid lighting effect.

Another objective of the present invention is to provide a lighting effect-controllable computer case, wherein the LED light strips can be cascaded to increase the number of the LED light strips.

A further objective of the present invention is to provide a lighting effect-controllable computer case, wherein the lighting controller is connected with the motherboard and able to directly receive instructions from the user without through network transmission, whereby the lighting controller does not need a network module, wherefore the fabrication cost and power consumption of the lighting-controller computer case is obviously reduced.

In order to achieve the abovementioned objectives, the present invention proposes a lighting effect-controllable computer case, which comprises a computer case containing electrically-connected computer components, including a motherboard, a power source, etc.; a lighting controller electrically connected with the motherboard; and at least one LED light strip arranged inside or outside the computer case, electrically connected with the lighting controller, including a plurality of LEDs, and controlled by at least one control signal of the lighting controller to present different lighting effects.

Below, embodiments are described in detail to make easily understood the objectives, technical contents, characteristics and accomplishments of the present invention.

DETAILED DESCRIPTION OF THE INVENTION

Figure 1:
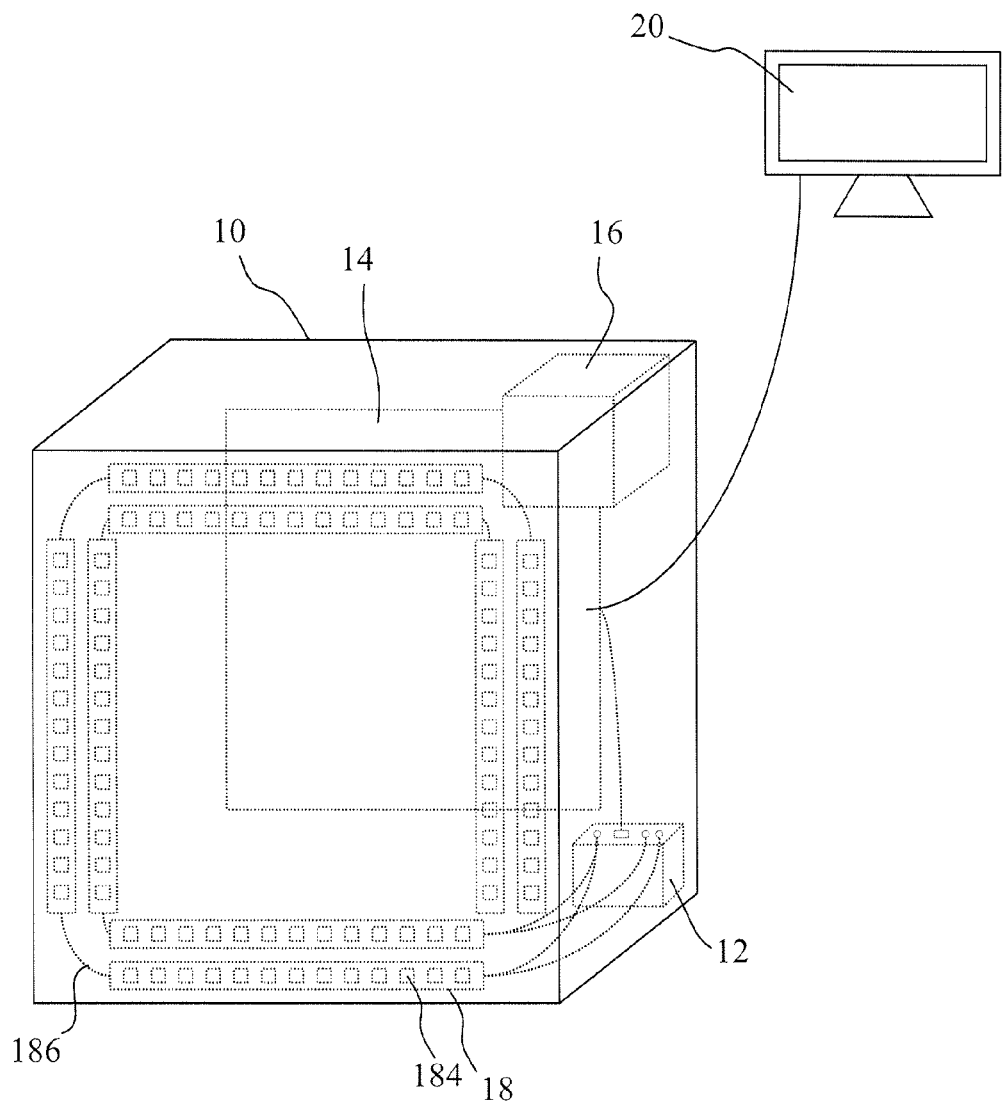
FIG. 1 is a diagram schematically showing a lighting effect-controllable computer case according to one embodiment of the present invention.

The present invention discloses a lighting effect-controllable computer case. Refer to FIG. 1 a diagram schematically showing a lighting effect-controllable computer case according to one embodiment of the present invention. The lighting effect-controllable computer case of the present invention comprises a computer case 10, a lighting controller 12 and at least one LED light strip 18. The computer case 10 contains electrically-connected computer components, including a motherboard 14, a power source 16, hard disc drives (not shown in the drawings), optical disc drives (not shown in the drawings), etc.

The lighting controller 12 is disposed inside or outside the computer case 10, and electrically connected with the motherboard 14. The LED light strips 18 are arranged inside the computer case 10 or disposed on the external surface of the computer case 10. The LED light strips 18 are electrically connected with the lighting controller 12. The LED light strips 18 are mutually connected with connection members 186. Each LED light strip 18 includes a plurality of LEDs 184. The lighting controller 12 sends out at least one control signal. The control signals control the LED light strips 18 to present different lighting effects. For example, the lighting controller 12 controls the LED light strips 18 to flash at different frequencies or light up continuously; the lighting controller 12 controls the LED light strips 18 to light cyclically; the lighting controller 12 controls the LED light strips 18 to emit different colored lights; the lighting controller 12 controls LEDs 184 to light up in an alternate way, i.e. one LED 184 is lighted up with two LEDs 184 beside the lighted up LED 184 are turned off. The control signal will be transmitted from one LED light strip 18 to the next LED light strip 18 through the connection member 186. Further, the control signal can control a single LED 184.

The computer system further comprises a screen electrically connected with the motherboard 14 inside the computer case 10. An application program installed in the computer is used to send out instructions enabling the lighting controller 12 to generate control signals. The user interface 20 of the application program is presented on the screen, and the user uses the user-interface 20 to input instructions to control the lighting effects of the LED light strips 18. The instructions are transmitted to the lighting controller 12 through the motherboard 14. In one embodiment, the application program is installed in a mobile device, such as a mobile phone or a tablet computer. In such a case, the user interface 20 is an operating interface of the application program installed in the mobile device.

Figure 2:
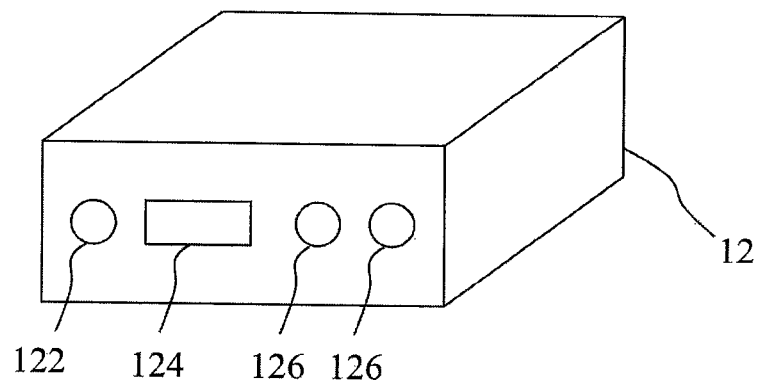
FIG. 2 is a diagram schematically showing a lighting controller according to one embodiment of the present invention.

Refer to FIG. 2 a diagram schematically showing a lighting controller according to one embodiment of the present invention. The lighting controller 12 has a plurality of sockets, including a power source socket 122, a connection port 124 and at least one light strip socket 126. The power source socket 122 is used to connect with a power source supplying power to the LED light strips 18. The power to light up all the LEDs 184 is supplied by the lighting controller 12. The connection port 124 may be a USB port. The signal cable is electrically connected with the lighting controller 12 and the motherboard 14. The lighting controller 12 receives the instructions, which are input by the user, from the motherboard 14, and converts the instructions into control signals. The light strip sockets 126 are electrically connected with the LED light strips 18 and transmit the control signals to the LED light strip 18. In other words, the control signals are transmitted from the motherboard 14 through the connection port 124 to the lighting controller 12 and then transmitted from the lighting controller 12 through the light strip sockets 126 to the LED light strips 18.

Figure 3:
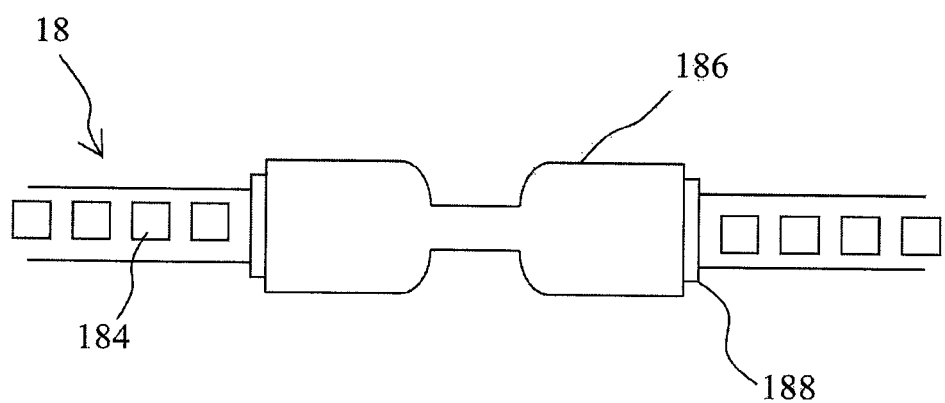
FIG. 3 is a diagram schematically showing the cascade of the LED light strips according to one embodiment of the present invention.

Refer to FIG. 3 a diagram schematically showing the cascade of the LED light strips according to one embodiment of the present invention. Two ends of the LED light strip 18 respectively have connection heads 188. The connection head 188 can be inserted into the connection member 186, whereby the LED light strips 18 are cascaded.

The computer case 10 is normally made of a metallic material. Magnets are disposed on the backs of the LED light strips 18, whereby the LED light strips 18 can be attached to the computer case 10, and whereby the user can easily adjust the positions and connections of the LED light strips 18, or even arrange the LED light strips 18 to form patterns and provide more lighting effects. In one embodiment, adhesive layers, such as double-side adhesive tapes, are disposed on the backs of the LED light strips 18, whereby after the release paper is stripped off from the double-side adhesive tapes, the LED light strips can be stuck to the computer case 10, which is made of an aluminum-based material or a plastic material, and unable to attract magnets.

In one embodiment, a mobile device is used to control the lighting effect-controllable computer case of the present invention, wherein application programs are installed in the computer and the mobile device. The instructions of the mobile device are uploaded to a cloud server; next, the cloud server transmits the instructions to the computer; next, the computer transmits the instructions to the lighting controller through the motherboard; then, the lighting controller sends the control signals to the LED light strips. Therefore, even though the mobile device and the computer respectively belong to different networks, the mobile device can still control the computer to operate the LED light strips as long as both the mobile device and the computer can link to the Internet.

The LED light strip of the present invention has a plurality of LEDs. However, the lighting controller of the present invention can control individual LEDs. The lighting controller can generate a signal to count the LEDs. Suppose that each LED light strip has 6 LEDs and that 3 LED light strips are cascaded. Thus, there are totally 18 LEDs in the cascaded LED light strips. If the user inputs an instruction: lighting up the first one of every group of three LEDs, the $1^{st}$, $4^{th}$, $7^{th}$, $10^{th}$, $13^{th}$, $16^{th}$ . . . LEDs are sequentially lighted up in the first cycle, and the other LEDs are turned off. In the second cycle, the $2^{nd}$, $5^{th}$, $8^{th}$, . . . LEDs are sequentially lighted up, and the other LEDs are turned off. The cascaded LED light strips will operate cyclically in the abovementioned way.

The lighting controller of the present invention will send signals to count the LEDs. Suppose that an LED light strip is added to or removed from one end of the existing cascaded LED light strips, the process of lighting up the LEDs will not be restarted from the $1^{st}$ LED.

In conclusion, the present invention proposes a lighting effect-controllable computer case, wherein at least one LED light strip is disposed in the computer case, and wherein the application program for controlling the lighting mode and lighting effect of the LED light strips is installed in the computer, and wherein the lighting controller is electrically connected with the motherboard of the computer. The user uses the user interface of the application program to input instructions for modifying parameters. According to the instruction, the lighting controller generates a control signal to the LED light strips. Thereby the user may determine the lighting mode according to his bias, including the number and colors of lighted LEDs, flashing simultaneously or flashing sequentially. The LED light strips may be arranged on the surface of the computer case, providing a dazzling effect. Alternatively, the LED light strips are disposed inside the computer case with the light permeating from the heat dissipation holes, presenting an effect of modest luxury. Therefore, the present invention can fully satisfy users in decorating computer cases.

The embodiments described above are only to exemplify the present invention but not to limit the scope of the present invention. Any equivalent modification or variation according to the characteristic or spirit of the present invention is to be also included within the scope of the present invention.

What is claimed is:

1. A lighting effect-controllable computer case comprising
   a computer case containing electrically-connected computer components, including a motherboard and a power source;
   a lighting controller electrically connected with said motherboard inside said computer case; and
   at least one LED (Light Emitting Diode) light strip disposed inside or outside said computer case, electrically connected with said lighting controller, including a plurality LEDs, and presenting different lighting effects according to at least one control signal generated by said lighting controller,
   wherein said lighting controller includes a connection port for electric connection with said motherboard, a power source socket for connection with a power cable for powering said LED light strips, and at least one light strip socket.

2. The lighting effect-controllable computer case according to claim 1, wherein a user operates a user interface to input an instruction; said instruction is transmitted to said lighting controller through said motherboard; said lighting controller converts said instruction into a control signal and transmits said control signal to said LED light strips.

3. The lighting effect-controllable computer case according to claim 1, wherein said lighting effects of said LED light strips include said LED light strips flashing at different frequencies, said LED light strips lighting up continuously, said LEDs lighting up alternately, and said LEDs lighting up sequentially and cyclically.

4. The lighting effect-controllable computer case according to claim 1, wherein two ends of each said LED light strip respectively have connection heads, and wherein said connection head can be inserted into a connection member, and wherein said connection member cascades two said LED light strips.

5. The lighting effect-controllable computer case according to claim 1, wherein said LED light strip has magnetic elements making said LED light strip attract to said computer case.

6. The lighting effect-controllable computer case according to claim 1, wherein an adhesive layer is disposed on a back of said LED light strip, and wherein said adhesive layer has a release paper, and wherein after said release paper is stripped off, said LED light strip can be stuck to said computer case.

7. The lighting effect-controllable computer case according to claim 2, wherein said user interface is an operating interface of an application program installed in a mobile device or a computer.

8. The lighting effect-controllable computer case according to claim 7, wherein said application program is simultaneously installed in said mobile device and said computer, and wherein a user operates said user interface of said mobile device to input an instruction, and wherein said instruction is uploaded to a cloud server, and wherein said cloud server transmits said instruction to said computer, and wherein said motherboard of said computer transmits said instruction to said lighting controller.

\* \* \* \* \*